US009062829B2

(12) United States Patent
Brestovansky et al.

(10) Patent No.: US 9,062,829 B2
(45) Date of Patent: *Jun. 23, 2015

(54) RECTANGULAR PARALLELEPIPED FLUID STORAGE AND DISPENSING VESSEL

(71) Applicants: Judith A. Moroco, Sharon, PA (US); Advanced Technology Materials, Inc., Danbury, CT (US)

(72) Inventors: Dennis Brestovansky, Newtown, CT (US); Michael J. Wodjenski, New Milford, CT (US); Jose I. Arno, Brookfield, CT (US); J. Donald Carruthers, Fairfield, CT (US); Philip A. Moroco, Sharon, PA (US)

(73) Assignee: ENTEGRIS, INC., Billerica, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/966,091

(22) Filed: Aug. 13, 2013

(65) Prior Publication Data

US 2013/0334068 A1 Dec. 19, 2013

Related U.S. Application Data

(60) Division of application No. 13/168,987, filed on Jun. 26, 2011, now Pat. No. 8,506,689, which is a continuation of application No. 12/401,325, filed on Mar. 10, 2009, now Pat. No. 7,972,421, which is a (Continued)

(51) Int. Cl.
*B01D 53/04* (2006.01)
*F17C 11/00* (2006.01)

(52) U.S. Cl.
CPC ............ *F17C 11/00* (2013.01); *B01D 2257/704* (2013.01); *F17C 2205/0391* (2013.01);

(Continued)

(58) Field of Classification Search
USPC ........... 95/131–133; 96/108, 121, 122; 222/3, 222/129; 220/367.1, 371, 745
See application file for complete search history.

(56) References Cited

U.S. PATENT DOCUMENTS

| 240,423 A | 4/1881 | James |
| 1,608,155 A | 11/1926 | Barnebey |

(Continued)

FOREIGN PATENT DOCUMENTS

| CN | 101093056 A | 12/2007 |
| CN | 101230948 A | 7/2008 |

(Continued)

OTHER PUBLICATIONS

Carrott, P., et al., "A New Method for the Determination of Micropore Size Distributions", "Studies in Surface Science and Catalysis: Characterization of Porous Solids", 1988, pp. 89-100, vol. 39.

(Continued)

*Primary Examiner* — Frank Lawrence
(74) *Attorney, Agent, or Firm* — Hultquist, PLLC; Steven J. Hultquist; Rosa Yaghmour (57) ABSTRACT

A fluid storage and dispensing apparatus including a fluid storage and dispensing vessel having a rectangular parallelepiped shape, and an integrated gas cabinet assembly including such fluid storage and dispensing apparatus and/or a point-of-use ventilation gas scrubber in the vented gas cabinet. By the use of physical adsorbent and chemical sorbent media, the gas cabinet can be enhanced in safety of operation, e.g., where the process gas supplied from the gas cabinet is of a toxic or otherwise hazardous character.

13 Claims, 4 Drawing Sheets

Related U.S. Application Data continuation of application No. 11/227,944, filed on Sep. 15, 2005, now Pat. No. 7,501,010, which is a continuation of application No. 10/314,777, filed on Dec. 9, 2002, now Pat. No. 6,991,671.

(52) U.S. Cl.
CPC ....... *B01D2259/4525* (2013.01); *Y02E 60/321* (2013.01); *B01D 2253/102* (2013.01); *B01D 2258/0216* (2013.01); *B01D 2257/40* (2013.01); *B01D 2257/93* (2013.01); *B01D 2257/706* (2013.01); *F17C 2201/0157* (2013.01); B01D 53/0407 (2013.01); *B01D 2253/304* (2013.01); *F17C 2205/0338* (2013.01); *B01D 2253/342* (2013.01)

(56) References Cited

U.S. PATENT DOCUMENTS

| | | | |
|---|---|---|---|
| 1,714,245 A | 5/1929 | Schaefer | |
| 2,356,334 A | 8/1944 | Maude et al. | |
| 2,423,702 A | 7/1947 | Hart | |
| 2,450,289 A | 9/1948 | Marek | |
| 2,663,626 A | 12/1953 | Spangler | |
| 2,971,607 A | 2/1961 | Caswell | |
| 2,987,139 A | 6/1961 | Bush | |
| 2,997,371 A | 8/1961 | Wadsworth et al. | |
| 3,006,153 A | 10/1961 | Cook | |
| 3,080,307 A | 3/1963 | Rinald | |
| 3,093,564 A | 6/1963 | Weisman et al. | |
| 3,116,132 A | 12/1963 | Haller et al. | |
| 3,144,200 A | 8/1964 | Taylor et al. | |
| 3,264,803 A | 8/1966 | Read | |
| 3,287,432 A | 11/1966 | Sensel | |
| 3,415,069 A | 12/1968 | Hauser | |
| 3,469,375 A | 9/1969 | Barrington et al. | |
| 3,539,467 A | 11/1970 | Bozarth et al. | |
| 3,675,392 A | 7/1972 | Reighter | |
| 3,713,273 A | 1/1973 | Coffee | |
| 3,719,026 A | 3/1973 | Sand | |
| 3,773,168 A | 11/1973 | Meinass | |
| 3,788,036 A | 1/1974 | Lee et al. | |
| 3,884,830 A | 5/1975 | Grant | |
| 3,912,472 A | 10/1975 | Marble | |
| 4,000,236 A | 12/1976 | Redfarn et al. | |
| 4,023,701 A | 5/1977 | Dockery | |
| 4,082,694 A | 4/1978 | Wennerberg et al. | |
| 4,139,416 A | 2/1979 | Palumbo et al. | |
| 4,255,169 A * | 3/1981 | Leliaert et al. | 95/273 |
| 4,263,018 A | 4/1981 | McCombs et al. | |
| 4,302,224 A | 11/1981 | McCombs et al. | |
| 4,343,770 A | 8/1982 | Simons | |
| 4,364,756 A | 12/1982 | Clarke et al. | |
| 4,373,938 A | 2/1983 | McCombs | |
| 4,378,982 A | 4/1983 | McCombs | |
| 4,414,005 A | 11/1983 | De Bievre et al. | |
| 4,526,887 A | 7/1985 | Sutt, Jr. | |
| 4,528,281 A | 7/1985 | Sutt, Jr. | |
| 4,540,678 A | 9/1985 | Sutt, Jr. | |
| 4,578,256 A | 3/1986 | Nishino et al. | |
| 4,625,627 A * | 12/1986 | Livanos et al. | 454/237 |
| 4,723,967 A | 2/1988 | Tom | |
| 4,738,693 A | 4/1988 | Tom | |
| 4,738,694 A | 4/1988 | Godino et al. | |
| 4,738,753 A | 4/1988 | Corato et al. | |
| 4,744,221 A | 5/1988 | Knollmueller | |
| 4,749,384 A | 6/1988 | Nowobilski et al. | |
| 4,788,973 A | 12/1988 | Kirchgeorg et al. | |
| 4,830,643 A | 5/1989 | Sassa et al. | |
| 4,880,765 A | 11/1989 | Knoblauch et al. | |
| 4,881,958 A | 11/1989 | Eckardt et al. | |
| 4,908,132 A | 3/1990 | Koval et al. | |
| 4,957,897 A | 9/1990 | Maroldo et al. | |
| 4,964,524 A | 10/1990 | Halene | |
| 4,967,934 A | 11/1990 | Andonian | |
| 4,989,160 A | 1/1991 | Garrett et al. | |
| 5,051,117 A | 9/1991 | Prigge et al. | |
| 5,071,820 A | 12/1991 | Quinn et al. | |
| 5,089,244 A | 2/1992 | Parent et al. | |
| 5,110,328 A | 5/1992 | Yokota et al. | |
| 5,112,367 A | 5/1992 | Hill | |
| 5,133,787 A | 7/1992 | Diot et al. | |
| 5,151,395 A | 9/1992 | Tom | |
| D331,094 S | 11/1992 | Sterett | |
| 5,202,096 A | 4/1993 | Jain | |
| 5,213,769 A | 5/1993 | Whitlock | |
| 5,238,469 A | 8/1993 | Briesacher et al. | |
| 5,356,852 A | 10/1994 | DeLiso et al. | |
| 5,372,619 A | 12/1994 | Greinke et al. | |
| 5,376,609 A | 12/1994 | Guile | |
| 5,409,526 A | 4/1995 | Zheng et al. | |
| 5,416,056 A | 5/1995 | Baker | |
| 5,417,742 A | 5/1995 | Tamhankar et al. | |
| 5,429,662 A | 7/1995 | Fillet | |
| 5,512,087 A | 4/1996 | Varner et al. | |
| 5,518,528 A | 5/1996 | Tom et al. | |
| 5,549,736 A | 8/1996 | Coffield et al. | |
| D373,643 S | 9/1996 | Einck | |
| 5,614,459 A | 3/1997 | Mondragon et al. | |
| 5,658,372 A | 8/1997 | Gadkaree | |
| 5,674,462 A | 10/1997 | Hayden et al. | |
| 5,676,735 A | 10/1997 | McManus | |
| 5,685,981 A | 11/1997 | Koslow | |
| 5,704,965 A | 1/1998 | Tom et al. | |
| 5,704,967 A | 1/1998 | Tom et al. | |
| 5,707,424 A | 1/1998 | Tom et al. | |
| 5,710,092 A | 1/1998 | Baker | |
| 5,744,421 A | 4/1998 | Robinson et al. | |
| D395,038 S | 6/1998 | Einck | |
| 5,800,596 A | 9/1998 | Collin et al. | |
| 5,833,936 A | 11/1998 | Euzen et al. | |
| 5,837,741 A | 11/1998 | Schwarz et al. | |
| 5,846,639 A | 12/1998 | Robinson et al. | |
| 5,851,270 A | 12/1998 | Olander | |
| 5,851,403 A | 12/1998 | Petrisko et al. | |
| 5,858,067 A * | 1/1999 | McManus | 95/109 |
| 5,876,487 A | 3/1999 | Dahlgren et al. | |
| 5,902,562 A | 5/1999 | Lagasse et al. | |
| 5,912,424 A | 6/1999 | Judkins et al. | |
| 5,914,294 A | 6/1999 | Park et al. | |
| 5,917,140 A | 6/1999 | Tom | |
| 5,935,305 A | 8/1999 | Tom et al. | |
| 5,961,697 A | 10/1999 | McManus et al. | |
| 5,964,659 A * | 10/1999 | Hertzler et al. | 454/253 |
| 5,965,483 A | 10/1999 | Baker et al. | |
| 5,972,253 A | 10/1999 | Kimber | |
| 6,006,797 A | 12/1999 | Buelow et al. | |
| 6,019,823 A | 2/2000 | Tischler et al. | |
| 6,030,698 A | 2/2000 | Burchell et al. | |
| 6,089,027 A | 7/2000 | Wang et al. | |
| 6,101,816 A | 8/2000 | Wang et al. | |
| 6,132,492 A | 10/2000 | Hultquist et al. | |
| 6,155,289 A | 12/2000 | Carlsen et al. | |
| 6,156,697 A | 12/2000 | Gadkaree | |
| 6,171,373 B1 | 1/2001 | Park et al. | |
| 6,187,713 B1 | 2/2001 | Gadkaree | |
| 6,189,369 B1 * | 2/2001 | Yokogi | 73/40.7 |
| 6,207,264 B1 | 3/2001 | Robinson et al. | |
| 6,225,257 B1 | 5/2001 | Putyera et al. | |
| 6,258,300 B1 | 7/2001 | Burchell et al. | |
| 6,284,705 B1 | 9/2001 | Park et al. | |
| 6,298,515 B1 | 10/2001 | Robinson | |
| 6,309,446 B1 | 10/2001 | Nakanoya et al. | |
| 6,309,449 B1 | 10/2001 | Klos et al. | |
| 6,309,450 B1 | 10/2001 | Millen et al. | |
| 6,406,519 B1 * | 6/2002 | Tom et al. | 95/95 |
| 6,436,175 B1 | 8/2002 | Coates et al. | |
| 6,453,924 B1 | 9/2002 | Wang et al. | |
| 6,475,411 B1 | 11/2002 | Burchell et al. | |
| 6,500,238 B1 | 12/2002 | Brandes et al. | |
| 6,521,019 B2 | 2/2003 | Jain et al. | |
| 6,540,819 B2 | 4/2003 | Tom et al. | |
| 6,561,213 B2 | 5/2003 | Wang et al. | |
| 6,592,653 B2 | 7/2003 | Wang et al. | |

(56) References Cited

U.S. PATENT DOCUMENTS

| | | |
|---|---|---|
| 6,626,981 B2 | 9/2003 | Wojtowicz et al. |
| 6,670,304 B2 | 12/2003 | Chang |
| 6,692,556 B2 | 2/2004 | Hayes et al. |
| 6,699,561 B2 | 3/2004 | Wolff |
| 6,743,278 B1 | 6/2004 | Carruthers |
| 6,764,755 B2 | 7/2004 | Tom et al. |
| 6,793,718 B2 | 9/2004 | Mochizuki et al. |
| 6,939,394 B2 | 9/2005 | Carruthers |
| 6,991,671 B2 * | 1/2006 | Brestovansky et al. ............ 95/95 |
| D545,393 S | 6/2007 | Brestovansky et al. |
| 7,455,719 B2 | 11/2008 | Carruthers |
| 7,494,530 B2 | 2/2009 | Carruthers |
| 7,501,010 B2 | 3/2009 | Brestovansky et al. |
| 7,972,421 B2 * | 7/2011 | Brestovansky et al. ......... 96/108 |
| 8,002,880 B2 | 8/2011 | Carruthers |
| 8,506,689 B2 | 8/2013 | Brestovansky et al. |
| 2002/0020292 A1 | 2/2002 | Wojtowicz et al. |
| 2002/0073847 A1 | 6/2002 | Sheline et al. |
| 2002/0103081 A1 | 8/2002 | Wolff |
| 2002/0194989 A1 | 12/2002 | Tuma et al. |
| 2003/0145731 A1 | 8/2003 | Biasio |
| 2003/0205581 A1 | 11/2003 | Wertenberger |
| 2003/0226588 A1 | 12/2003 | Olander et al. |
| 2005/0014643 A1 | 1/2005 | Lini et al. |
| 2005/0039425 A1 | 2/2005 | Olander et al. |
| 2005/0188846 A1 | 9/2005 | Carruthers |
| 2009/0188392 A1 | 7/2009 | Carruthers |

FOREIGN PATENT DOCUMENTS

| | | |
|---|---|---|
| DE | 1095796 A | 12/1960 |
| DE | 2264512 A | 1/1974 |
| DE | 3139781 A1 | 4/1983 |
| EP | 0344917 A1 | 12/1989 |
| EP | 0860640 A1 | 8/1998 |
| EP | 1072839 A2 | 1/2001 |
| FR | 2550466 A1 | 2/1985 |
| GB | 2232364 A | 12/1990 |
| JP | 52-72373 A | 6/1977 |
| JP | 55-73315 A | 6/1980 |
| JP | 56-158087 A | 12/1981 |
| JP | 56-158126 A | 12/1981 |
| JP | 60-150831 A | 8/1985 |
| JP | 61-133116 A | 6/1986 |
| JP | 61-144495 A | 7/1986 |
| JP | 63-88017 A | 4/1988 |
| JP | 1-131015 A | 5/1989 |
| JP | 2-66399 A | 3/1990 |
| JP | 02-146400 A | 6/1990 |
| JP | 4-224102 A | 8/1992 |
| JP | 7-124468 A | 5/1995 |
| JP | 8-257358 A | 10/1996 |
| JP | 9-242995 A | 9/1997 |
| JP | 11-82891 A | 3/1999 |
| JP | 2000-28098 A | 1/2000 |
| JP | 2000-205496 A | 7/2000 |
| JP | 2001-287905 A | 10/2001 |
| JP | 2002-156097 A | 5/2002 |
| JP | 2002-158021 A | 5/2002 |
| WO | 9407794 A1 | 4/1994 |
| WO | 9500234 A1 | 1/1995 |
| WO | 9716509 A1 | 5/1997 |
| WO | 9744118 A1 | 11/1997 |
| WO | 9959700 A1 | 11/1999 |
| WO | 0015330 A1 | 3/2000 |
| WO | 0193985 A1 | 12/2001 |
| WO | 02051525 A1 | 7/2002 |

OTHER PUBLICATIONS

Dacey, J., et al., "Adsorption on Saran Charcoal: A New Type of Molecular Sieve", "Trans. Faraday Soc.", Mar. 6, 1954, pp. 740-748, vol. 50.

Dacey, J., et al., "The formation of carbon from polyvinylidene chloride", "Proceedings of the Fourth Conference on Carbon", 1960, pp. 315-319.

MacDonald, J., et al., "Carbon Adsorbents for Natural Gas Storage", "Fuel", Jan. 1998, pp. 61-64, vol. 77, No. 1/2.

Parkyns, N., et al., "Chapter 11: Natural Gas Adsorbed on Carbon", "Porosity in Carbons: Characterization and Applications", 1995, pp. 291-325.

Polarz, S., et al., "Nanoporous Materials", "Journal of Nanoscience and Nanotechnology", Dec. 2002, pp. 581-612, vol. 2, No. 6.

Quinn, D., et al., "Natural Gas Storage", "Carbon", Feb. 1992, pp. 1097-1103, vol. 30, No. 7.

Rouquerol, F., et al., "Chapter 9.5.4: Adsorption of water vapour", "Adsorption by Powders and Porous Solids: Principles, Methodology, and Applications", Oct. 1998, pp. 276-277.

Sing, K., et al., "Reporting Physisorption Data for Gas/Solid Systems with Special Reference to the Determination of Surface Area and Porosity", "Pure Appl. Chem.", 1985, pp. 603-619, vol. 57, No. 4.

NOTE: For the non-patent literature citations that no month of publication is indicated, the year of publication is more than 1 year prior to the effective filing date of the present application.

Wojtowicz, M., et al., "Microporous Carbon Adsorbents for Hydrogen Storage", "Int. J. Soc. of Mater. Eng. Resour.", 1999, pp. 253-266, vol. 7, No. 2.

* cited by examiner

RECTANGULAR PARALLELEPIPED FLUID STORAGE AND DISPENSING VESSEL

CROSS-REFERENCE TO RELATED APPLICATIONS

This is a divisional under 35 USC 120 of U.S. patent application Ser. No. 13/168,987 filed Jun. 26, 2011 in the names of Dennis Brestovansky, et al. for "RECTANGULAR PARALLELEPIPED FLUID STORAGE AND DISPENSING VESSEL," and issued Aug. 13, 2013 as U.S. Pat. No. 8,506,689, which in turn is a continuation under 35 USC 120 of U.S. patent application Ser. No. 12/401,325 filed on Mar. 10, 2009 in the names of Dennis Brestovansky, et al. for "RECTANGULAR PARALLELEPIPED FLUID STORAGE AND DISPENSING VESSEL," and issued on Jul. 5, 2011 as U.S. Pat. No. 7,972,421, which is a continuation under 35 USC 120 of U.S. patent application Ser. No. 11/227,944 filed Sep. 15, 2005 in the names of Dennis Brestovansky, et al. for "RECTANGULAR PARALLELEPIPED FLUID STORAGE AND DISPENSING VESSEL," and issued on Mar. 10, 2009 as U.S. Pat. No. 7,501,010, which in turn is a continuation under 35 USC 120 of U.S. patent application Ser. No. 10/314,777 filed Dec. 9, 2002 in the names of Dennis Brestovansky, et al. for "RECTANGULAR PARALLELEPIPED FLUID STORAGE AND DISPENSING VESSEL," and issued on Jan. 31, 2006 as U.S. Pat. No. 6,991,671. The priorities of said U.S. patent application Ser. No. 13/168,987, U.S. patent application Ser. No. 12/401,325, U.S. patent application Ser. No. 11/227,944 and U.S. patent application Ser. No. 10/314,777 are hereby claimed under 35 USC 120.

FIELD OF THE INVENTION

The present invention relates generally to a fluid storage and dispensing apparatus including a fluid storage and dispensing vessel having a rectangular parallelepiped shape, and to an integrated gas cabinet assembly including such fluid storage and dispensing apparatus.

DESCRIPTION OF THE RELATED ART

Sorbent-based fluid storage and dispensing apparatus have come into use in semiconductor manufacturing applications in recent years, as gas supplies for a variety of semiconductor manufacturing unit operations.

Examples of such semiconductor manufacturing operations include, without limitation: ion implantation, using gaseous reagents such as boron trifluoride, arsine, phosphine, and diborane; chemical vapor deposition of metal-containing films, using a wide variety of organometallic precursor reagent gases; and fabrication of silicon-on-insulator (SOI) optoelectronic device structures, utilizing silicon source reagents such as silane and halosilane gases.

Commercially available sorbent-based fluid storage and dispensing apparatus include the gas source systems available under the trademarks SDS® and SAGE® from ATMI, Inc. (Danbury, Conn.) and Matheson Gas Products, Inc. (Parsippany, N.J.). Such systems typically include a conventional high-pressure gas cylinder vessel as the receptacle for a solid-phase physical adsorbent medium, e.g., a molecular sieve (aluminosilicate), activated carbon or other material having sorptive affinity for the fluid to be stored in and selectively dispensed from the gas cylinder vessel. The gas cylinder vessel holds the sorbent medium in the form of a bed of the sorbent particles, and the vessel is charged with the sorbate gas so that it is sorptively retained on the sorbent bed at pressures that are typically much lower than the high pressures at which such gas cylinders have historically been used (e.g., pressures on the order of 1500-5000 torr or even higher) for gas storage.

The prior art high pressure gas cylinders utilized substantial superatmospheric pressures for gas storage, since such pressure levels permitted significant inventory of gas to be supplied from the vessel. This substantial gas supply capacity, however, is accompanied by the hazards and safety concerns incident to the storage of high pressure compressed gases. High pressure gas cylinders in the event of cylinder rupture or leakage of gas from a malfunctioning or damaged valve head involve the risk of catastrophic release of gas to the ambient atmosphere, as the pressurized gas is rapidly discharged to the environment of the vessel. This is particularly problematic in applications such as semiconductor manufacturing, where many commonly used reagent and cleaning gases are highly toxic, as well as environmentally dangerous, e.g., pyrophoric or explosive, in contact with the atmosphere.

The physical adsorbent-based gas storage and dispensing vessels of the above-referenced type achieve a substantial improvement in the safety and utility of gas supply systems, since the gas is advantageously held on the sorbent bed at low storage pressures, e.g., subatmospheric pressures of 400 to 700 torr, or otherwise at pressures that are well below those at which gas has been stored in high pressure compressed gas cylinders. Accordingly, in the event of a vessel breakage or valve head failure, the rate of gas egress into the ambient environment is very low, e.g., diffusional egress when the contained gas on the sorbent bed in the vessel is held at subatmospheric pressure. As a result of its enhanced safety character, the sorbent-based gas storage and dispensing vessel is correspondingly accommodated by simpler and less costly containment, monitoring and back-up safety systems during transportation and use, than those required by conventional high pressure compressed gas cylinders.

In use of the physical adsorbent-based gas storage and dispensing system, dispensing is carried out by effecting desorption of gas from the physical adsorbent medium held in the interior volume of the vessel, so that the desorbed gas may then be flowed out of the vessel.

Desorption can be effected by a pressure differential, whereby a pressure is provided exteriorly of the vessel that is lower than the interior pressure in the vessel. Alternatively, or additionally, desorption may be effected by heating of the physical adsorbent medium so as to disrupt the low associative bonds between the sorbate gas and the physical adsorbent medium. As a still further dispensing modality, a carrier gas may be flowed through the interior volume of the gas cylinder vessel, so as to impose a concentration differential on the adsorbed gas to effect mass transfer of the sorbate gas into the carrier gas stream, for subsequent dispensing from the vessel with the through-flowing carrier gas.

The gas cylinder vessel, as used for conventional high-pressure compressed gas storage and dispensing, and as heretofore used for physical adsorbent-based gas storage and dispensing systems, is, as denoted by its name, a cylindrically-shaped vessel, typically formed of steel or other metal alloy, which has an upper neck opening. A valve head assembly is coupled to the neck opening, e.g., by welding, brazing, or the like, and includes a flow control valve in a valve head block containing a flow passage, with the active valve element being disposed in the flow passage and selectively openable and closable, as desired, to enable discharge flow of the reagent fluid from the interior volume of the gas cylinder vessel.

The valve head may include a hand wheel, automatic valve acutator or other structural elements for operation of the valve. The valve head typically is fabricated with a flow connector at a discharge face thereof, or equipped with other means for coupling flow lines, conduits, manifolds, etc. to the valve head, to enable gas to be flowed from the vessel through the valve head and flow circuitry coupled thereto, to a locus of use. The valve head may optionally include additional passages and ports therein, e.g., for fill of the vessel with sorbent medium, for charging of the installed sorbent bed with adsorbable gas, for purging of the vessel, for bake-out of the sorbent medium in the vessel in pretreatment thereof, etc., and the valve head may be integrated with or coupled to suitable dispensing, monitoring, instrumentation and control devices, as desired for operation of the gas storage and dispensing system.

Fluid storage and dispensing apparatus of the above-described type are more fully described in U.S. Pat. No. 5,518,528 issued to Glenn M. Tom and James V. McManus, the disclosure of which is hereby incorporated herein by reference in its entirety.

The vessels that have been employed in the commercial physical adsorbent-based low pressure gas storage and dispensing systems have continued to be the heavy metal cylinders of the type conventionally used in high-pressure compressed gas storage and dispensing apparatus. This persistence of usage of the heavy metal cylinders in sorbent-based systems is attributable to a number of factors.

Such cylindrical vessels have been in use for over 100 years, and are generally approved by regulatory authorities worldwide for storage, transport and dispensing of gases. These vessels are readily available, being mass-produced by a number of manufacturers. They are relatively inexpensive, and widely accepted.

Ancillary to these factors is the fact that since volume of stored gas is a function of pressure, cylindrical vessels as a result of their minimum area (i.e., circular) cross-sectional shape, are able to accommodate elevated pressure levels of contained gas, with minimum stress and deformation, relative to other geometries. It has therefore been common practice to utilize such vessels at the highest pressure consistent with safety considerations, in order to maximize the inventory of gas in the vessel. Since the cylindrical vessels are thus "overdesigned" for high pressure gas duty, such vessels have been regarded as a safe packaging. Further, where toxic and hazardous gases are involved, regulations have mandated such safe packaging.

For all these reasons, heavy metal cylindrical vessels have been the standard packaging for physical adsorbent-based gas storage and delivery systems. Despite this fact, it is to be recognized that such vessels have numerous associated deficiencies. As a consequence of their overdesigned character, the cylinder wall is thick, and due to their fabrication of steel or other structural metals, such vessels have significant weight and therefore are costly to transport, relative to lighter weight articles. Further, the heavy cylindrical vessels are of vertically upstanding elongate form, having a length to diameter ratio that is generally >>1, and thus are bulky and unwieldy to move, install and change out.

There is therefore a compelling need in the art for new and improved packaging for physical adsorbent-based gas storage and dispensing systems.

SUMMARY OF THE INVENTION

In one aspect, the invention relates to a fluid storage and dispensing apparatus, comprising a fluid storage and dispensing vessel having an interior volume, wherein the interior volume contains a physical adsorbent sorptively retaining a fluid thereon and from which the fluid is desorbable for dispensing from the vessel, and a dispensing assembly coupled to the vessel for dispensing desorbed fluid from the vessel, wherein the fluid storage and dispensing vessel is of rectangular parallelepiped form.

Another aspect of the invention relates to a gas cabinet assembly, comprising:

a gas cabinet defining an enclosed interior volume and including flow circuitry in said interior volume arranged for dispensing of gas from the cabinet; and a gas source disposed in the interior volume of the gas cabinet and coupled in gas supply relationship to the flow circuitry, wherein said gas source comprises at least one fluid storage and dispensing vessel of rectangular parallelepiped form, each said fluid storage and dispensing vessel containing a physical adsorbent sorptively retaining said gas thereon, and a dispensing assembly coupled to said fluid storage and dispensing vessel for dispensing said gas from the vessel for flow to said flow circuitry.

A further aspect of the invention relates to a method of reducing footprint of a gas cabinet assembly comprising a gas cabinet containing a gas source including at least one gas storage and dispensing vessel containing a physical adsorbent sorptively retaining said gas thereon, said method comprising providing each of said at least one gas storage and dispensing vessel as a vessel with a rectangular parallelepiped form.

A still further aspect of the invention relates to a method of storing and dispensing a gas at low pressure, comprising: fabricating a vessel having a rectangular parallelepiped form; disposing a physical adsorbent in the vessel having sorptive affinity for said gas; charging said gas to said vessel for adsorption on said physical adsorbent; sealing said vessel with a valve head containing an actuatable valve, to enclose the physical adsorbent and adsorbed gas, and isolate same from an exterior environment of the vessel; desorbing the adsorbed gas from the physical adsorbent, and actuating the actuatable valve in the valve head, to flow gas from the vessel and through the actuatable valve, for gas dispensing.

In another aspect, the invention relates to a method of reducing fluid burden on an exhaust scrubber of a semiconductor manufacturing facility comprising a vented gas cabinet through which ventilation gas is flowed in operation of the gas cabinet, said method comprising contacting said ventilation gas prior to discharge thereof from the gas cabinet with a scrubbing medium in the gas cabinet, to remove scrubbable contaminant therefrom, and discharging scrubbed ventilation gas from the gas cabinet, whereby need for treatment of discharged ventilation gas by said exhaust scrubber of the semiconductor manufacturing facility is obviated.

Yet another aspect of the invention relates to a gas cabinet assembly comprising: a vented gas cabinet defining an enclosed interior volume and including flow circuitry in said interior volume arranged for dispensing of process gas from the cabinet; a process gas source disposed in the interior volume of the gas cabinet and coupled in gas supply relationship to the flow circuitry; a ventilation gas source arranged for feeding ventilation gas to the vented gas cabinet; a ventilation gas outlet for discharging ventilation gas from the vented gas cabinet; and a point-of-use scrubber disposed in the interior volume of the vented gas cabinet, arranged to remove scrubbable contaminant from the ventilation gas prior to discharge of the ventilation gas from the vented gas cabinet via the ventilation gas outlet.

Other aspects, features and embodiments of the present invention will be more fully apparent from the ensuing disclosure and appended claims.

SUMMARY OF THE INVENTION

DETAILED DESCRIPTION OF THE INVENTION, AND PREFERRED EMBODIMENTS THEREOF

The present invention is based on the discovery that a physical adsorbent-based fluid storage and dispensing apparatus may be fabricated utilizing a fluid storage and dispensing vessel having a rectangular parallelepiped conformation, with surprising and unexpected advantages as regards the nature and extent of the desorption process, the packing density achievable for the physical sorbent medium in the vessel, and the utility of the fluid storage and dispensing apparatus comprising such vessel for semiconductor manufacturing operations.

By way of background to the ensuing explanation of the unanticipated advantages of the rectangular parallelepiped conformation vessel in the fluid storage and dispensing apparatus of the present invention, it would on initial consideration appear to be highly disadvantageous to employ a rectangular parallelepiped conformation for a physical-adsorbent-based fluid storage and dispensing system, since: (i) a rectangular parallelepiped vessel has six faces, and twelve weld-lines required for fabrication if each face of the vessel is a separate piece (by contrast, a cylindrical vessel may be formed without seams from tubular rolled steel stock); (ii) consistent with (i), the fabrication cost of a rectangular conformation vessel would be expected to be substantially higher than for a corresponding cylindrical vessel; (iii) a rectangular parallelepiped conformation involves "sharp" corners at the juncture of adjacent perpendicularly oriented walls that offer the potential of forming voids at the line of juncture, wherein the sorbent bed would not "pack" against the corner, relative to a corresponding cylindrical geometry vessel (which is free of such corners, and instead is a minimum cross-sectional area shape circumscribing the bed of physical sorbent material in the interior volume of the vessel); and (iv) the intersection of two perpendicular walls with one another produces a joint that is susceptible to rupture by pressure or force directed thereon, relative to a "seamless" cylindrical vessel.

Applicant has discovered, however, that the rectangular parallelepiped conformation results in a vessel which does have less tightly packed sorbent bed regions adjacent the seams at the intersection of adjacent walls, but that rather than being a disadvantage, such lower density sorbent bed regions are in fact advantageous as higher gas flow conductance pathways for interstitial desorbed or unadsorbed gas to flow out of the bulk volume of the sorbent bed.

Further, precisely because the cylindrical vessel is a minimum cross-sectional area conformation, with a minimum circumferential extent of circumscribing wall area, the amount of sorbent that is "presented" to the wall in the cylindrical vessel is maximized. Considering the converse, the peripheral extent of the wall that bounds (is adjacent to) the sorbent bed in cross-section is much greater in the rectangular parallelepiped conformation than in the cylindrical vessel. The rectangular parallelepiped conformation thereby enables higher volume egress of gas from the vessel than from a correspondingly sized cylindrical vessel, because the wall surface bounding the sorbent bed is non-adsorbing in character, and there is proportionally more of it in the rectangular conformation vessel, at the outer margins of the sorbent bed, than there is in the cylindrical vessel. As a result, the desorbed gas at the wall regions is less readsorbed subsequent to its initial desorptive release from the sorbent medium than desorbed gas in the interior portions of the sorbent bed.

Further, the rectangular parallelepiped conformation has particular utility for holding sorbent in a monolithic form, of a type as disclosed for example in U.S. Pat. No. 6,743,278 issued Jun. 1, 2004 to J. D. Carruthers for "Gas Storage and Dispensing System with Monolithic Carbon Adsorbent." As used in such context, "monolithic" means that the sorbent medium is in a unitary or block-like form, in contradistinction to conventional finely divided forms such as beads, particles, granules, pellets, and the like, which are generally utilized in the form of a bed comprising a multiplicity of such beads, particles, granules, pellets, etc. Thus, in the bed form of multiple finely divided physical adsorbent elements, the void volume of the active sorbent is in major part interstitial, or inter-particle, in character, varying according to the dimensions, shape and packing density of the sorbent particles. By contrast, in a monolithic form, the void volume of the active sorbent is in form of porosity intrinsic to the sorbent material and voids that may have been formed in the bulk sorbent body during its processing.

In one embodiment, the invention relates to a rectangular parallelepiped vessel defining a closed interior volume and having a port to which is coupled a gas dispensing assembly, for selective discharge of gas from the vessel. The rectangular parallelepiped vessel contains sorbent medium in a suitable form, e.g., in a form that provides sufficient capacity for sorptive retention of gas in a desired quantity, that provides good desorptive release of gas under desorption conditions, that provides good working capacity with good heels behavior (i.e., high extent of desorption of initially adsorbed gas), and that has an appropriate sorptive affinity for the gas of interest so that low gas pressure is maintained in the interior volume of the vessel during storage of gas therein.

The physical adsorbent can therefore be in a divided form, e.g., in the form of beads, pellets, rings, platelets, tablets, cylindrical extrudates, granules, cubic shapes, molded geometrically regular or irregular shapes, or any other form that is usefully applied to the adsorbent medium when disposed in the interior volume of the rectangular parallelepiped vessel and utilized therein for holding the gas to be stored in and selectively dispensed from such vessel.

The physical adsorbent when provided in such divided form is utilized in the form of a mass of such forms, as a bed of sorbent medium. The size of such divided forms may be readily determined for a given end use application of the invention, based on mass transfer considerations and packing factors for the particular shaped divided form that is employed in the vessel.

Alternatively, the physical adsorbent may be in a monolithic form, comprising blocks, bricks, boules or similar forms of the adsorbent material that are of a size commensurate with the rectangular parallelepiped vessel, so that vessel contains one or a small number, e.g., less than 75, more preferably less than 20, of the discrete monolithic articles. In a further preferred aspect, the vessel contains no more than 8 such discrete monolithic articles, even more preferably no more than four such articles, and most preferably the vessel contains a single monolithic physical adsorbent article.

The monolithic article(s) deployed in the rectangular parallelepiped vessel provide(s) a sorbent mass (aggregately, if the sorbent is provided in the form of multiple monolithic articles) that is preferably conformed in size and shape to the interior volume of the rectangular parallelepiped vessel, so that the sorbent mass of the monolithic article(s) occupies at least 60% of the interior volume of the rectangular parallelepiped vessel, preferably in a range of from about 75% to about 95% of the interior volume of such vessel.

If provided in a single monolithic form, the sorbent medium may for such purpose be formed in situ in the vessel, e.g., by pyrolysis of an organic resin that is in liquid or otherwise flowable form, with which the vessel is filled prior to pyrolysis of same in the vessel.

If alternatively provided in the form of multiple monolithic articles, each of such articles has a length that is between 0.3 and 1.0 times the height of the interior volume of the vessel, and a cross-sectional area that is between 0.1 and 0.5 times the rectangular cross-sectional area of the vessel. Each monolithic member preferably has a rectangular parallelepiped shape for maximizing the volumetric usage of the interior volume of the vessel, wherein each of the monolithic members may be laterally and/or longitudinally abutted in surface contact with adjacent monolithic members in the interior volume of the vessel. Alternatively, in some instances, it may be desirable for the sorbent monolithic members to be in the form of solid cylinders, with the respective cylindrical members being loaded into the interior volume so as to tangently abut one another along their facing side surface, and to at least partially abut one another in face-to-face contact at their circular cross-section end surfaces.

The rectangular parallelepiped shape of the gas storage and dispensing vessel in the gas storage and dispensing apparatus of the present invention accommodates the vessel to installation and containment in a gas cabinet, such as is widely used in semiconductor manufacturing facilities, with minimization of wasted volume inside the gas cabinet. This achieves a substantial benefit in relation to conventional cylindrical vessels, which by virtue of their circular cross-section create wasted volume in proximity to the walls and other rectangular and square components of the gas cabinet that are adjacent or in close proximity to the gas storage and dispensing vessel.

Further, when multiple vessels are deployed in the gas cabinet, and are arranged in side-by-side fashion, the circular cross-section of conventional cylindrical vessels produces a significant wasted volume in the interior of the gas cabinet, whereas rectangular parallelepiped vessels of the present invention can be arranged in side-by-side relationship with their adjacent side wall surfaces in abutting contact with each other or in near proximity, to minimize the presence and amount of the wasted space in the interior of the gas cabinet.

The rectangular parallelpiped vessels in the gas storage and dispensing apparatus of the invention therefore achieve significant reduction of unused space within the gas cabinet, relative to conventional cylindrical vessels. As a result, more gas can be stored in same interior volume of the gas cabinet with the vessels of the invention than is possible with the cylindrical vessels of the prior art. This in turn reduces the frequency of the vessel change-outs in operation of the gas cabinet, which further reduces the operational time that is consumed in changing out depleted gas supply vessels, and further reduces the cost of ownership of the gas cabinet facility. The rectangular parallelpiped vessel of FIG. 1 accommodates a volume-fill space of 3.62 liters whereas a conventional cylindrical vessel taking the same physical location in the gas box has a volume-fill space of only 2.2 liters. In addition, the gas cabinet for a same inventory of supplied gas can be made smaller, thereby reducing the footprint of the gas cabinet and the airflow required to produce the ventilation necessary for safety in the gas cabinet.

As used herein, the term "gas cabinet" and "gas cabinetry" refer to enclosures in which is deployed at least one gas supply vessel. The enclosure may be equipped with flow circuitry, including piping, manifolding, valving, mass flow controllers, pressure and temperature monitoring devices, and the enclosure may be ventilated, involving flow of clean dry air (CDA) therethrough from a source of same exterior to the enclosure, with the vented exhaust being discharged to a house exhaust treatment system for the facility in which the enclosure is deployed, or otherwise treated and recirculated through the enclosure as a recycled sweep gas.

The enclosure in specific applications may be a component part of a semiconductor process tool, such as a gas box in an ion implantation system.

The enclosure can be arranged for holding a single gas supply vessel, or it may be arranged for holding an array of vessels, e.g., 2 or 3 or more vessels, wherein each may be deployed to provide a same or different gas, and wherein the vessel(s) may be coupled with flow circuitry in any suitable manner, e.g., with a back-up vessel in the enclosure to which the flow circuitry is switched upon depletion of the gas from a currently on-stream vessel, by suitable monitoring and control componentry in the enclosure, such as a cycle timer joined to a microprocessor controller and arranged to operate the on-stream vessel for a predetermined time, or a time during which one or more monitored process conditions is in a predetermined set point range.

The rectangular parallelepiped vessel in the gas supply apparatus of the invention can be fabricated in any suitable manner, e.g., by welding of sheet metal or by extrudation of thin sheet metal stock. The metal may be of any suitable type, including steel, stainless steel, aluminum, copper, brass, bronze, or other metals or metal alloys. Alternatively, the vessel may be formed by similar techniques or other techniques, e.g., ultrasonic bonding, melt bonding, laser welding, etc., from polymeric materials, ceramic materials, glasses and vitreous materials, and composite materials having suitable character as a material of construction for the gas storage and dispensing vessel, e.g., with sufficiently low permeability for the gas containment function of the vessel.

The vessel is suitably fabricated with a port at a face thereof, e.g., at a top face of the vessel, to which the valve head or other dispensing assembly can be joined in leak-tight fashion, e.g., by suitable bonding or sealing techniques and materials appropriate to the specific material of the vessel and the dispensing means. The vessel may be charged with the particulate sorbent through the open port prior to joining of the valve head to the vessel, or the vessel may be formed with installation of the monolithic form of the sorbent prior to attachment of the final wall member, or the monolithic sorbent can be formed in situ as previously described.

Once installed in the vessel, the sorbent medium may be degassed, or pretreated in other manner, such as by thermal treatment, pressurization/depressurization cycling, or other method. The sorbate gas is charged to the vessel prior to final sealing, and the vessel during such charging may be cooled or otherwise thermally managed, such as by step-wise charging, to dissipate the heat of sorption.

The charged vessel then is sealed, e.g., by closure of the head valve, and thereafter the charged gas supply vessel can be stored, transported, or placed in use, as appropriate.

Figure 1:
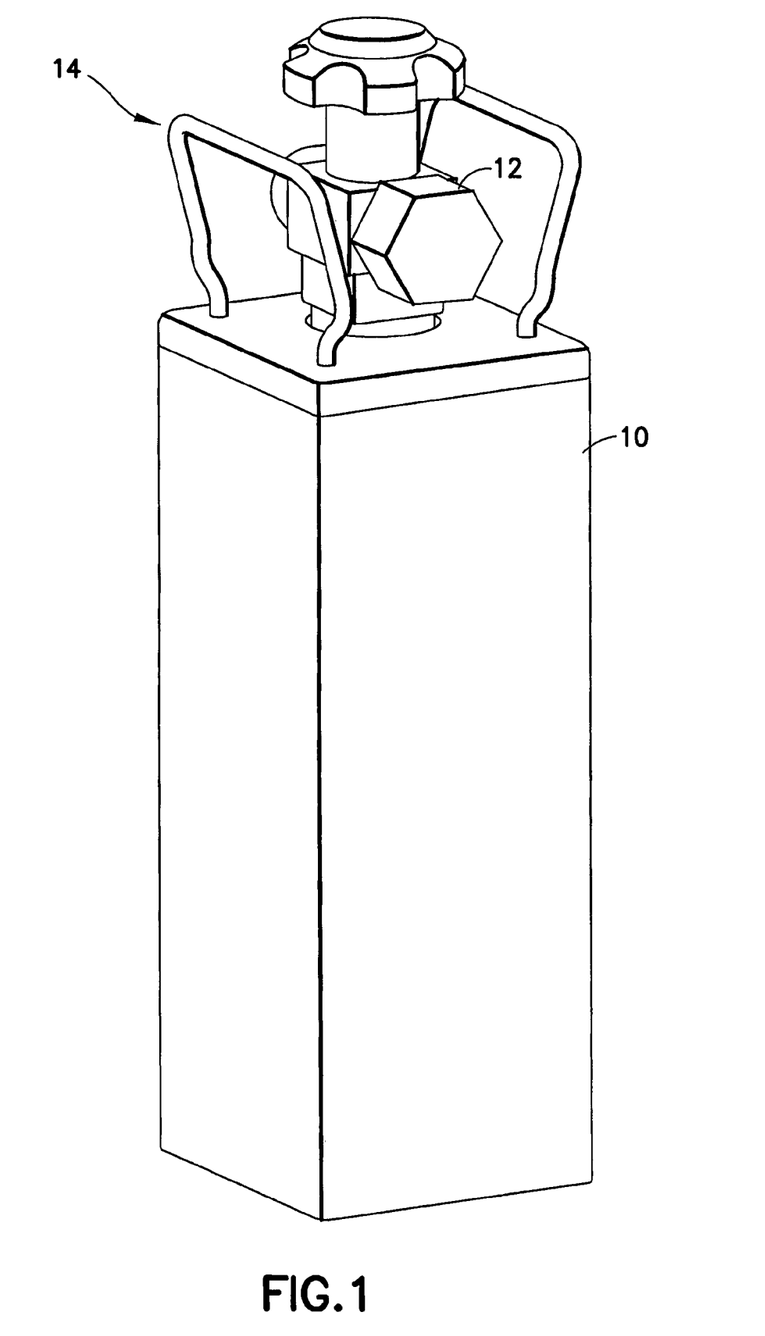
FIG. 1 is a perspective view of a rectangular parallelepiped fluid storage and dispensing vessel according to one embodiment of the present invention, with a pipe valve connection.

Referring now to the drawings, FIG. 1 is a perspective view of a rectangular parallelepiped fluid storage and dispensing vessel 10 according to one embodiment of the present invention, with a pipe valve connection valve head 12 and handles 14 welded to the top face of the vessel. The vessel 10 in a specific embodiment is formed with a welded steel wall construction, having a square cross-section along the vertical (longitudinal) axis of the vessel. The walls of the vessel are 0.100 inch thick carbon steel, and the interior volume of the vessel is 3.62 liters. The handles 14 are ¼ inch rod stock, formed into the shape shown, and welded at the respective ends to the vessel 10.

The dispensing valve of the pipe valve connection valve head 12 is threadably engaged with the vessel 10, by a 1½" pipe thread connection. The valve head may have any suitable number of ports, e.g., single port valve heads, dual port valve heads, 3-port valve heads, etc.

Figure 2:
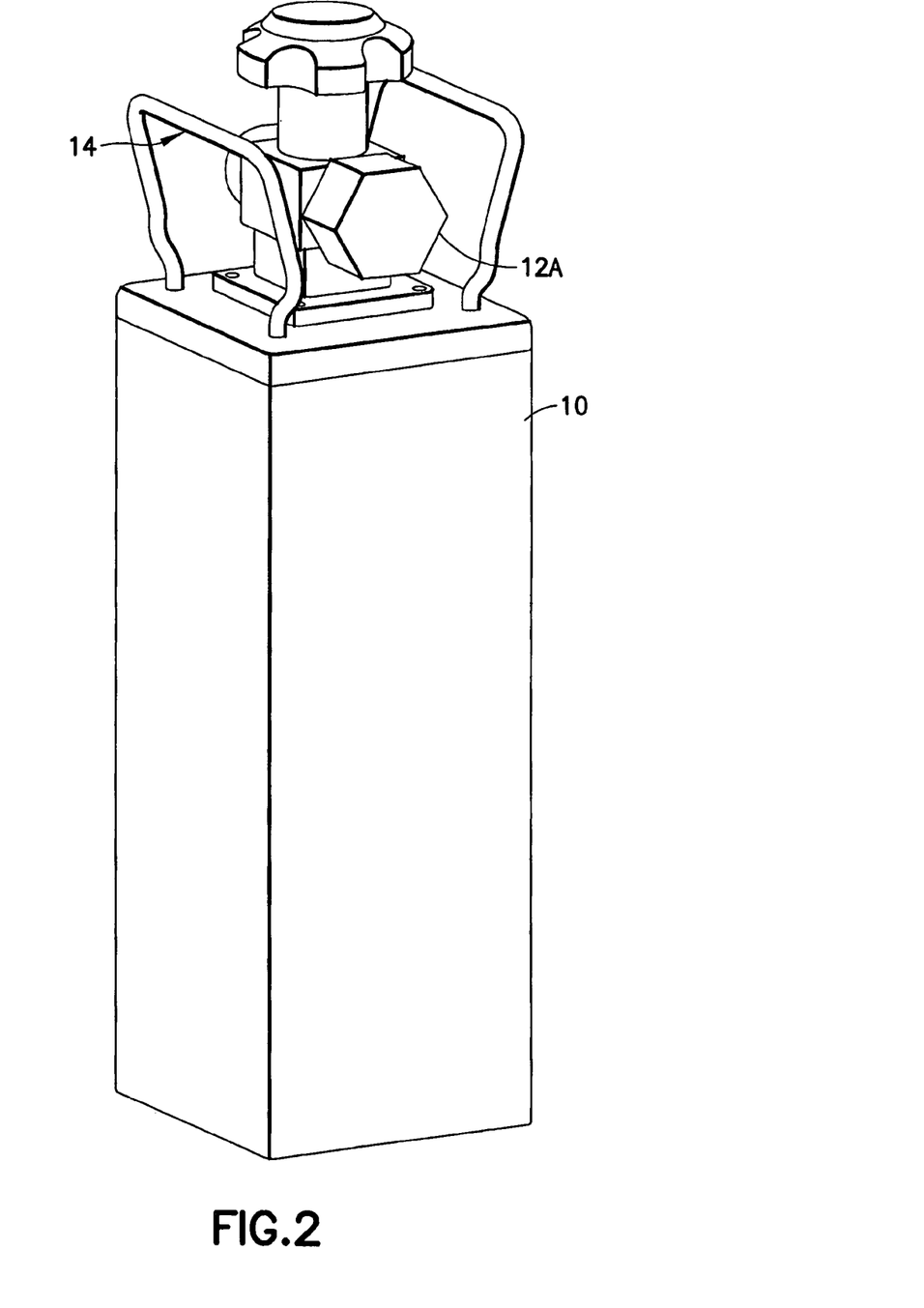
FIG. 2 is a perspective view of a rectangular parallelepiped fluid storage and dispensing vessel according to another embodiment of the present invention, with a flange type valve connection.

FIG. 2 is a perspective view of a rectangular parallelepiped fluid storage and dispensing vessel 10 according to another embodiment of the present invention, with a flange type valve connection valve head 12A and handles 14 welded to the top face of the vessel 10. The valve head of FIG. 2 therefore differs from that shown in FIG. 1, as having a flange type connection in the FIG. 2 embodiment, as opposed to the pipe type connection shown in FIG. 1. The flange connection shown in FIG. 2 comprises a flange member with an o-ring groove that bolts to the top surface of the vessel 10.

The gas storage and dispensing vessels in the embodiments of FIGS. 1 and 2 have interior volumes that contain physical adsorbent medium sorptively retaining a sorbate gas thereon, with the sorbate gas being dispensed through the valve head through dispensing flow circuitry when such circuitry is coupled with the valve head and the valve in the valve head is opened to permit desorption of the sorbate gas and discharge of the desorbate gas from the vessel to the flow circuitry and downstream gas-consuming process. The sorbate gas may be desorbed from the sorbent material for discharge from the vessel in any suitable manner, involving for example pressure-mediated desorption, thermally-mediated desorption, and/or concentration gradient-mediated desorption.

The downstream gas-consuming process may be of any suitable type, e.g., a semiconductor manufacturing process. Illustrative examples of such semiconductor manufacturing processes include, without limitation, ion implantation, doping by methods other than ion implant, chemical vapor deposition, reactive ion etching, photoresist residue removal, etc.

The sorbate gas likewise can be of any suitable type, including by way of example, without limitation, arsine, phosphine, nitrogen trifluoride, boron trifluoride, boron trichloride, diborane, trimethylsilane, tetramethylsilane, disilane, silane, germane, organometallic gaseous reagents, hydrogen selenide, hydrogen telluride, and the like. The sorbate gas may be widely varied in type, depending on the physical adsorbent medium employed and the end use application for which the desorbed and dispensed gas is to be employed.

The sorbate gas can be contained in the vessel at any suitable pressure, including subatmospheric, atmospheric and superatmospheric pressures. The pressure of the stored fluid may be subatmospheric, e.g., a subatmospheric pressure that does not exceed about 700 torr for doping and ion implantation applications of the invention. For example, ion implantation gases, e.g., arsine, phosphine, and boron trifluoride, may be stored in the vessel at a pressure in a range of from about 400 to about 700 torr. Gas may also be stored in the vessel at substantially atmospheric pressure, or at low superatmospheric pressure, e.g., a pressure not exceeding about 1500 torr, in various specific applications of the invention.

Figure 3A:
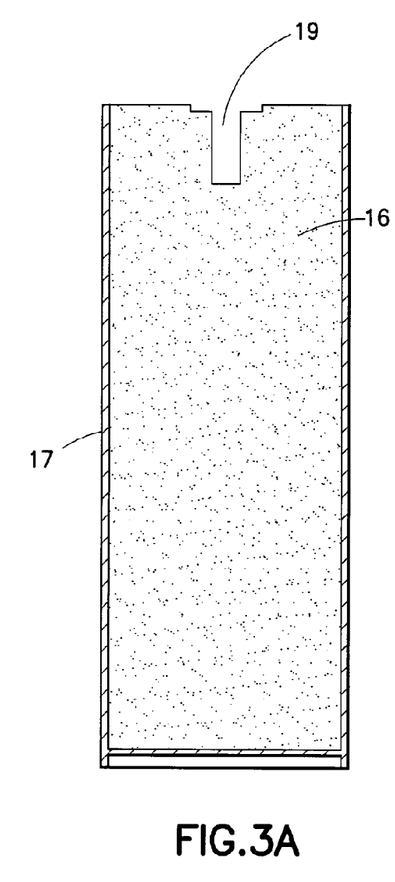
FIG. 3A is a front cross-sectional view of a portion of a rectangular parallelepiped fluid storage and dispensing vessel of the type shown in FIG. 2, the vessel including a adsorbent material wherein but lacking a lid.
Figure 3B:
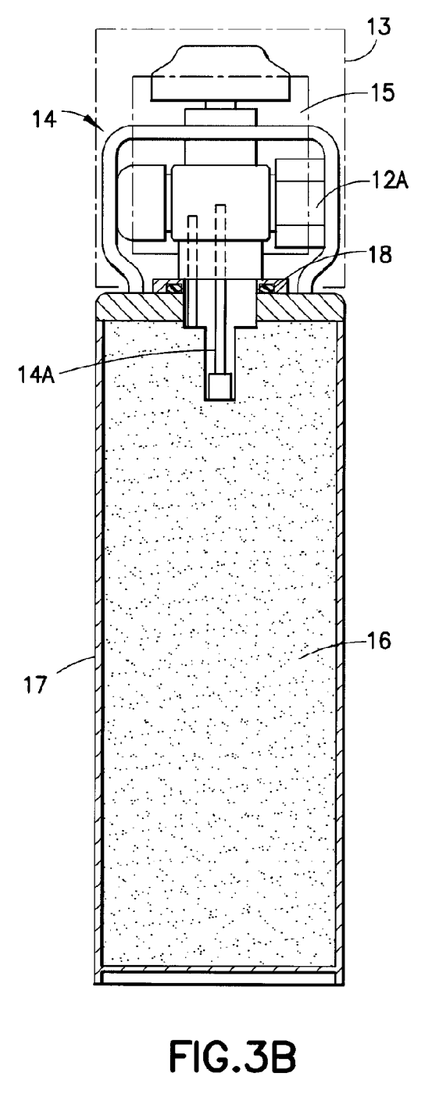
FIG. 3B provides the same view as FIG. 3A, with the vessel being closed with a lid having an associated valve assembly including a portion extending downward from the lid.

FIGS. 3A-3B provide front elevation views of a rectangular parallelepiped fluid storage and dispensing vessel of the type shown in FIG. 2, showing details of the structure thereof. FIG. 3A shows a vessel, without a lid, including at least one wall 17 bounding an interior volume containing adsorbent material 16. FIG. 3B shows the vessel of FIG. 3A, with the vessel being closed with a lid having an associated valve assembly 14. As illustrated, the gas storage and dispensing vessel contains an interior volume in which the physical adsorbent 16 is disposed. The physical adsorbent may be of any suitable type, including carbon, activated carbon, metal-impregnated carbon, molecular sieve (aluminosilicate) materials, porous silicon, silica, alumina, styrene divinylbenzene polymeric materials, sorptive clays, functionalized sintered glass media, etc. As shown in FIGS. 3A-3B, the physical adsorbent 16 includes a cavity 19 in which a downwardly extending portion 14A of the valve 14 may be received.

The physical adsorbent may likewise be of any suitable form appropriate to the use of the gas storage and dispensing system in the particular application for which it is employed. The sorbent medium may be in a divided form, such as beads, granules, pellets, etc., or it may be in a monolithic form as hereinabove described.

The vessel is equipped with a flange type valve connection valve head 12A, with the flange member being secured to the top wall of the vessel in a leak-tight manner by means of O-ring seal 18, and the handles being secured by welding to the top wall of the vessel.

In another variation of the structure of the parallelepiped-shaped storage and dispensing vessel, FIG. 3 shows the vessel as being provided with an optional cap 13. The cap 13, depicted in schematic form, is likewise of rectangular parallelepiped shape, and is provided with openings 15 on respective side faces of the cap. The vessel when provided with such cap can be fabricated without the handle shown in FIG. 3, or alternatively, a handle can be fabricated on the cap 13. The openings 15 on the cap 13 provide a handle structure, allowing the entire vessel assembly to be manually gripped and transported, and such openings also permit access to the valve head 12A, e.g., for coupling of a dispensing line to the discharge port of the valve head.

The cap 13 can be secured to the vessel container body in the modified vessel construction of FIG. 3, in any suitable manner, as for example by means of complementarily mating coupling elements on the vessel container body and the cap, whereby the cap and vessel container body can be mechanically interlocked with one another, e.g., a bayonet-type coupling, threadably engageable matable coupling, mechanical fastener coupling (latch-type coupling, bolt-and-nut type coupling, etc.), spring-biased compression fit coupling, etc.

The cap also affords the advantage of protecting the valve head from impact, compression/tension forces in contact with other structures or bodies, and other interactions with other objects holding the potential for damaging the valve head or impairing its utility.

The cap can be further provided with a handle element, welded or otherwise joined to the cap 13, e.g., to a side surface thereof or affixed in other manner to the cap.

As a still further alternative, the vessel assembly can include separate cap and handle members, each separately coupled to the vessel container body.

As a specific example of a fluid storage and dispensing apparatus in accordance with the present invention, an apparatus of the type shown in and described with reference to FIG. 3 is fabricated with a vessel having a 4.5 inch×4.5 inch cross-section. The height of the vessel is 12.3 inches, and the wall and floor of the vessel are 0.188 inch thickness. The vessel is formed of welded box tubing. The vessel can be fabricated with a flanged, O-ring seal top plate, or alternatively with a welded top plate.

The flanged, O-ring seal top plate arrangement can be effected with a top plate of suitable thickness, e.g., about 0.61 inch, having a central opening. An O-ring, e.g., of Viton® elastomer, is positioned around the periphery of the central opening, and a valve insertion ring is then fixed in position in the opening. The valve insertion ring includes an upper disc portion from which downwardly depends a plug portion of smaller diameter than the upper disc portion, the plug portion fitting closely within the central opening of the top plate, with the O-ring between the underside of the upper disc portion and the upper surface of the top plate.

The vessel cap has a twist and lock mechanism, with a spring plunger locking key including elongated slots in the cap base, and three shoulder bolts. In use, the cap base elongated slots are pressed down over the three shoulder bolts, rotated 15 degrees to engage the bolts, and the locking plunger thereafter prevents further rotation and positionally fixes the cap on the vessel. Alternatively, the vessel cap has a direct attachment and two locking plungers.

The cap side wall openings (openings 15 in FIG. 3) are 3 inch×3 inch openings, and plastic grip-pads can be affixed to the upper edges of the openings, to facilitate grippability for manual handling of the apparatus.

The vessel of the illustrative apparatus can be drawn over mandrel (DOM) square-cross-sectioned tubing, and can have rounded corners or sharp 90° corners, with the square-cross-sectioned tubing being formed from a welded tube stock, with a weld that disappears in the cold drawing process. The result of such cold drawing process is a seamless square-cross-sectioned tube closed at one end and open at its opposite end. The top plate is welded to the open end of the drawn square-cross-sectioned tube after insertion of the monolithic adsorbent into the interior volume of the square-cross-sectioned tube. The top plate can have an NPT thread to accommodate the valve head assembly, and shoulder pins to accommodate the cap when the cap is of a bayonet cap design.

The vessel in the illustrative apparatus can be formed of forged aluminum, steel, or other suitable material of construction. The top plate can be formed of a same or different material of construction.

As discussed hereinabove, fluid storage and dispensing apparatus in accordance with the present invention are usefully disposed in gas cabinets in a manner affording substantially improvement over the cylindrical vessels conventionally used in the prior art. By virtue of their rectangular parallelepiped shape, vessels of the present invention can be deployed in a gas cabinet in a conformal manner, as regards the rectangular geometry of conventional gas cabinetry. By shape conformality to the gas cabinet (i.e., with walls of the fluid storage and dispensing vessel in close facing proximity or even, as is preferred, in abutting relationship to a side wall of the gas cabinet), the "lost volume" attributable to cylindrical vessels is avoided in the practice of the invention.

Figure 4:
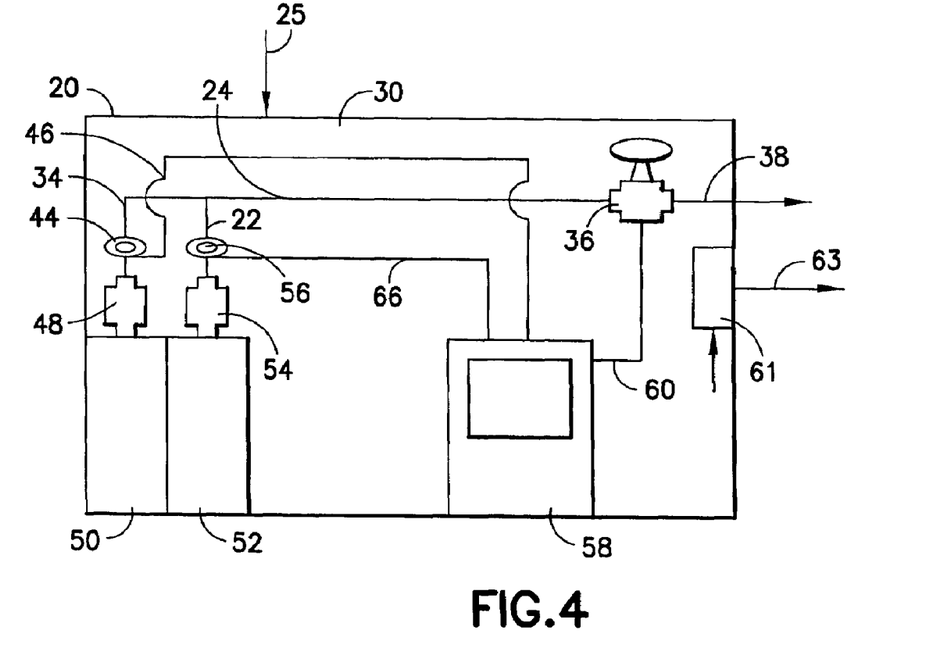
FIG. 4 is a schematic representation of a gas cabinet assembly according to a further aspect of the invention, having disposed therein a multiplicity of rectangular parallelepiped fluid storage and dispensing vessels according to the invention.

FIG. 4 is a schematic representation of a gas cabinet assembly according to a further aspect of the invention, comprising a gas cabinet 20 having an interior volume 30, in which is disposed rectangular parallelepiped gas storage and dispensing vessels 50 and 52 as components of respective gas storage and dispensing apparatus constructed according to the invention.

The gas storage and dispensing apparatus including gas storage and dispensing vessel 50 has a valve head 48 coupled with automatic valve actuator 44, and operable to open the valve in valve head 48 to flow desorbed sorbate gas from vessel 50 into branch discharge line 34 connected to manifold line 24.

The automatic valve actuator 44 is connected by signal transmission line 46 to central process unit (CPU) 58, which may comprise a general purpose programmable computer programmably arranged to carry out operation with dispensing of gas from the vessel 50 during a predetermined period of operation of the gas cabinet system, by actuation of the automatic valve actuator 44 for such purpose, and shut-off of the gas flow control valve in valve head 48 by appropriate signal transmitted in line 46 to automatic valve actuator 44.

Thus, gas dispensed from vessel 50 flows through the valve head 48 and discharge line 34 to manifold line 24 coupled with gas flow dispensing regulator 36 and finally is discharged in the outlet line 38 coupled to the gas flow dispensing regulator 36. The gas flow dispensing regulator 36 is coupled by signal transmission line 60 to the CPU 58, for modulation of the gas flow dispensing regulator 36 in accordance with the gas demand of the downstream gas-consuming process (not illustrated in FIG. 4).

The FIG. 4 gas cabinet assembly also includes the correspondingly arranged gas storage and dispensing vessel 52, equipped with valve head 54 and automatic valve actuator 56 coupled to CPU 58 by signal transmission line 66, whereby gas from vessel 52 may be selectively flowed in the branch discharge line 22 to manifold line 24 coupled with gas flow dispensing regulator 36 in the same manner as the first-described gas storage and dispensing apparatus comprising vessel 50.

In the FIG. 4 gas cabinet assembly, the gas storage and dispensing vessels 50 and 52 are arranged in side-by-side abutting relationship to one another, with vessel 50 being abuttingly reposed against the side wall of the gas cabinet 20, and both vessels 50 and 52 being abuttingly reposed against a back wall of the gas cabinet 20.

In the use of the physical adsorbent-based gas storage and dispensing systems of the invention, the gas cabinet assembly can be materially simplified by eliminating the ducting typically employed for flowing the vent gas from the gas cabinet to the exhaust system of the semiconductor manufacturing facility, which typically includes a large scrubber for treating the exhaust streams of the facility. Because the physical adsorbent-based gas storage and dispensing system of the invention is a low pressure gas supply system, the potential egress rate of gas from damaged or malfunctioning valve heads, couplings, etc. in the gas cabinet is minimized, and the rate of flow of sweep gas such as CDA through the cabinet interior volume can be markedly reduced in relation to gas cabinet systems employing high pressure gas cylinders of the prior art.

In another aspect of the invention, the enhanced safety of the physical adsorbent-based gas storage and dispensing systems can be exploited to eliminate the piping to the exhaust scrubber system, and to utilize in place thereof a simple point-of-use scrubber in the gas cabinet itself, to ensure the removal of any low level contaminants in the vent gas discharged from the gas cabinet.

An illustrative embodiment of such point-of-use scrubber is schematically shown in the FIG. 4 gas cabinet system. As illustrated, an inlet line 25 delivers CDA or other sweep gas into the gas cabinet 20, to purge out the interior volume 30 of the cabinet so that any toxic or hazardous contaminants in the cabinet are displaced from the interior volume and do not accumulate to any levels that approach the threshold limit value (TLV) of the specific hazardous components that may be involved in the gas dispensing operation involving the gas source vessels in the cabinet.

The cabinet is equipped in the interior volume 30 of the cabinet 20 with a point-of-use gas scrubber 61 which takes in the vent gas from the interior volume 30 and subjects it to contact with a suitable scrubber medium, e.g., a chemisorbent reactive with the gas contaminant species to remove same to below detectable and hazardous concentrations. The gas scrubber 61 may as shown be wall-mounted on a side wall of the cabinet. Gas contacted with the scrubber medium is discharged from the cabinet 20 in vent gas discharge line 63.

Although shown schematically for ease of illustration and description, it will be recognized that the scrubber may be deployed in any suitable manner, e.g., as a small scrubber unit on the inlet (low pressure side) of a venturi device in a gas panel in the gas cabinet. The gas in vent gas discharge line 63 may be passed to the ducting of the house exhaust, bypassing the house exhaust scrubber and thereby reducing the gas burden on the house scrubber, while maintaining a high level of safety as regards the character of the gas discharged from the gas cabinet.

In the point-of-use scrubber employed in the embodiment of FIG. 4, the scrubber may be equipped with an end-point detector, to ascertain the end point of the scrubber material (viz., its approach to exhaustion as a result of reactive depletion of the scrubber material in extended use in the gas cabinet). Various types of endpoint detection can be employed.

In a first type of endpoint detector, a sight glass may be incorporated in the scrubber, e.g., by installation thereof in a window opening of the scrubber housing or container, when the scrubber is of a type that changes color when it contacts the target contaminant species in the gas cabinet vent gas. The incipient exhaustion of the scrubber medium can thereby be visually monitored by an operator of the gas cabinet, and the change-out of the scrubber medium, to replace the depleted material with fresh scrubber medium, can be efficiently scheduled as part of a program of routine inspection of the scrubber medium through the sight glass.

A second type of endpoint detector uses a colorimetric sensor to automatically detect the color change of the scrubber medium and to actuate an alarm or report to alert operational personnel of the need to change out the scrubber. The sensor may also be arranged to shut off the flow valves in the gas cabinet to prevent operation from resuming until the scrubber medium is changed out.

A toxic gas monitor (TGM) may also be integrated into the body of the scrubber unit in a third approach to endpoint determination. This approach is usefully employed where the scrubber medium employed in the point-of-use scrubber unit does not evidence a color change in contact with the target gas contaminant species.

A fourth endpoint determination technique utilizes a programmable logic controller (PLC) unit to count the number of change-outs of gas storage and dispensing vessels since the installation of the scrubber unit, and to actuate alarm or report means to provide an output indicative of the need to change out the scrubber unit. The PLC unit may be arranged to calculate the amount of gas to which the scrubber will be exposed from a single gas storage and dispensing vessel and from the inputted scrubber medium capacity, the number of gas storage and dispensing vessel change-outs that can be performed before the scrubber medium is exhausted, is determined.

It will be appreciated that the compositions and methods of the invention may be practiced in a widely variant manner, consistent with the broad disclosure herein. Accordingly, while the invention has been described herein with reference to specific features, aspects, and embodiments, it will be recognized that the invention is not thus limited, but is susceptible of implementation in other variations, modifications and embodiments. Accordingly, the invention is intended to be broadly construed to encompass all such other variations, modifications and embodiments, as being within the scope of the invention hereinafter claimed.

What is claimed is:

1. A method of reducing flow of sweep gas through an interior volume of a ventilated gas cabinet arranged to contain a gas supply system including gas supply vessel(s), said method comprising using physical adsorbent-based gas storage and dispensing vessel(s) as said gas supply vessel(s), and reducing flow of sweep gas through said interior volume, in relation to flow of sweep gas through said interior volume when the gas cabinet contains gas supply vessel(s) that are not physical adsorbent-based.

2. The method of claim 1, wherein said gas supply vessel(s) contain a sorbate gas at subatmospheric pressure.

3. The method of claim 1, wherein said gas supply vessel(s) contain a sorbate gas selected from the group consisting of arsine, phosphine, hydrogen selenide, hydrogen telluride, nitrogen trifluoride, boron trifluoride, boron trichloride, diborane, trimethylsilane, tetramethylsilane, disilane, silane, germane, and organometallic gaseous reagents.

4. A gas cabinet assembly comprising an enclosure with an interior volume that contains physical adsorbent-based gas supply vessel(s), and arranged to be ventilated by flow of sweep gas through the interior volume from a source of said sweep gas exterior to the enclosure, and discharge thereof from the enclosure, wherein the gas cabinet assembly is arranged so that it flows said sweep gas through the enclosure at a reduced rate of flow in relation to a corresponding gas cabinet assembly containing gas supply vessel(s) lacking said physical adsorbent.

5. The gas cabinet assembly of claim 4, wherein the enclosure is a component part of a semiconductor process tool.

6. The gas cabinet assembly of claim 4, wherein the enclosure comprises a gas box in an ion implantation system.

7. The gas cabinet assembly of claim 4, wherein the enclosure is equipped with flow circuitry.

8. The gas cabinet assembly of claim 7, wherein the flow circuitry includes at least one component selected from the group consisting of piping, manifolding, valving, mass flow controllers, pressure and temperature monitoring devices.

9. The gas cabinet assembly of claim 7, wherein the flow circuitry is adapted to be coupled with an array of gas supply vessels of the physical adsorbent-based gas storage and dispensing system, and the flow circuitry is switched, upon depletion of gas from a currently on-stream vessel, to a back-up vessel in the enclosure.

10. The gas cabinet assembly of claim 4, wherein the enclosure contains monitoring and control componentry.

11. The gas cabinet assembly of claim 4, wherein the at least one gas supply vessel contains a sorbate gas selected from the group consisting of arsine, phosphine, hydrogen selenide, hydrogen telluride, nitrogen trifluoride, boron trifluoride, boron trichloride, diborane, trimethylsilane, tetramethylsilane, disilane, silane, germane, and organometallic gaseous reagents.

12. The gas cabinet assembly of claim 4, wherein the sweep gas discharged from the enclosure is discharged to a house exhaust system of a facility in which the enclosure is deployed.

13. The gas cabinet assembly of claim 4, comprising flow circuitry in which the sweep gas is discharged from the enclosure for treatment and recirculated through the enclosure as a recycled sweep gas.

\* \* \* \* \*